United States Patent
Suda et al.

(10) Patent No.: US 11,330,407 B2
(45) Date of Patent: May 10, 2022

(54) BASE STATION DEVICE, TERMINAL DEVICE, WIRELESS COMMUNICATION SYSTEM, AND RADIO RESOURCE INFORMATION NOTIFICATION METHOD

(71) Applicant: FUJITSU LIMITED, Kawasaki (JP)

(72) Inventors: Kenji Suda, Yokohama (JP); Toshiro Sawamoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/658,525

(22) Filed: Oct. 21, 2019

(65) Prior Publication Data

US 2020/0053522 A1 Feb. 13, 2020

Related U.S. Application Data

(63) Continuation of application No. PCT/JP2017/019538, filed on May 25, 2017.

(51) Int. Cl.
*H04W 4/18* (2009.01)
*H04W 8/24* (2009.01)
(Continued)

(52) U.S. Cl.
CPC .............. *H04W 4/18* (2013.01); *H04W 8/24* (2013.01); *H04W 28/06* (2013.01); *H04W 84/042* (2013.01)

(58) Field of Classification Search
CPC ......... H04W 72/1284; H04W 52/0264; H04W 48/16; H04W 72/1268; H04W 64/00;
(Continued)

(56) References Cited

U.S. PATENT DOCUMENTS

| | | | |
|---|---|---|---|
| 6,950,663 B2 * | 9/2005 | Pihl | G01S 5/10 342/450 |
| 8,015,581 B2 * | 9/2011 | Ruiz-Velasco | H04N 21/433 725/50 |

(Continued)

FOREIGN PATENT DOCUMENTS

| | | |
|---|---|---|
| JP | 2004-507187 A | 3/2004 |
| JP | 2009-253397 A | 10/2009 |

(Continued)

OTHER PUBLICATIONS

"Narrowband Internet of Things: Evolutions, Technologies, and Open Issues". Jun Xu , Junmei Yao, Lu Wang, Zhong Ming, Kaishun Wu, and Lei Chen. IEEE Internet of Things Journal, vol. 5, No. 3, Jun. 2018 (Year: 2018).*

(Continued)

*Primary Examiner* — William D Cumming
(74) *Attorney, Agent, or Firm* — Myers Wolin, LLC

(57) ABSTRACT

According to an aspect of the embodiments, a base station device in a wireless communication system including a terminal device and a base station device that is wirelessly connected to the terminal device and transmits signals to the terminal device, the base station device includes, an acquirer which acquires a first version of a signal format corresponding to the terminal device, and a transmitter that transmits, to the terminal device, difference information relating to a signal used for a different purpose from a purpose of a signal of a second version corresponding to the base station device when the first version differs from the second version.

10 Claims, 14 Drawing Sheets

(51) Int. Cl.
*H04W 28/06* (2009.01)
*H04W 84/04* (2009.01)

(58) Field of Classification Search
CPC ......... H04W 72/0413; H04W 72/0406; H04W 56/045; H04W 36/0058; H04W 68/0054; H04W 36/0069; H04W 52/18
USPC .......... 455/63.1, 456.1, 456.5; 370/329, 331, 370/336
See application file for complete search history.

(56) References Cited

U.S. PATENT DOCUMENTS

| | | | | |
|---|---|---|---|---|
| 8,437,294 | B2* | 5/2013 | Kawamura | H04L 27/2647 370/329 |
| 8,639,269 | B2* | 1/2014 | Tsutsui | H04W 68/005 455/456.5 |
| 8,683,526 | B2* | 3/2014 | Ruiz-Velasco | H04N 21/433 725/50 |
| 8,880,635 | B1* | 11/2014 | Singh | G06F 16/9574 709/213 |
| 9,237,559 | B2* | 1/2016 | Inumaru | H04L 5/0092 |
| 9,344,985 | B2* | 5/2016 | Loehr | H04L 69/323 |
| 9,402,255 | B2* | 7/2016 | Lohr | H04W 56/0045 |
| 9,621,284 | B2* | 4/2017 | Morita | H04L 5/00 |
| 9,749,927 | B2* | 8/2017 | Lohr | H04W 72/0446 |
| 9,756,594 | B2* | 9/2017 | Loehr | H04L 69/323 |
| 10,153,859 | B2* | 12/2018 | Morita | H04J 11/003 |
| 10,305,642 | B2* | 5/2019 | Cui | H04B 7/2656 |
| 10,567,122 | B2* | 2/2020 | Cui | H04W 72/1268 |
| 10,652,349 | B2* | 5/2020 | Matsuda | G06N 5/022 |
| 2003/0040323 | A1* | 2/2003 | Pihl | H04W 64/00 455/456.1 |
| 2004/0048625 | A1 | 3/2004 | Papoutsis et al. | |
| 2008/0168066 | A1* | 7/2008 | Ruiz-Velasco | H04N 5/775 |
| 2011/0217993 | A1* | 9/2011 | Tsutsui | H04W 68/005 455/458 |
| 2011/0261772 | A1 | 10/2011 | Iwamura et al. | |
| 2011/0314503 | A1* | 12/2011 | Ruiz-Velasco | H04L 12/4625 725/47 |
| 2012/0039279 | A1* | 2/2012 | Chen | H04L 1/1861 370/329 |
| 2013/0250925 | A1* | 9/2013 | Lohr | H04W 56/0045 370/336 |
| 2013/0294414 | A1* | 11/2013 | Inumaru | H04W 36/0069 370/331 |
| 2014/0006247 | A1* | 1/2014 | Chai | G06Q 40/04 705/37 |
| 2014/0029586 | A1* | 1/2014 | Loehr | H04B 3/36 370/336 |
| 2014/0050205 | A1* | 2/2014 | Ahn | H04W 72/0413 370/336 |
| 2014/0269642 | A1 | 9/2014 | Forenza et al. | |
| 2015/0333846 | A1* | 11/2015 | Morita | H04J 11/005 455/63.1 |
| 2016/0149650 | A1* | 5/2016 | Gao | H04K 3/00 375/346 |
| 2016/0218838 | A1* | 7/2016 | Cui | H04L 5/00 |
| 2016/0227505 | A1* | 8/2016 | Loehr | H04W 56/0065 |
| 2016/0302129 | A1* | 10/2016 | Lohr | H04W 36/30 |
| 2017/0141868 | A1* | 5/2017 | Morita | H04B 15/00 |
| 2019/0229858 | A1* | 7/2019 | Cui | H04L 5/00 |
| 2019/0364492 | A1* | 11/2019 | Azizi | H04W 48/16 |
| 2020/0053522 | A1* | 2/2020 | Suda | H04W 28/06 |
| 2020/0205062 | A1* | 6/2020 | Azizi | H04W 68/005 |
| 2021/0136765 | A1* | 5/2021 | Gao | H04L 25/0204 |

FOREIGN PATENT DOCUMENTS

| | | | | |
|---|---|---|---|---|
| JP | 2010-136309 A | | 6/2010 | |
| JP | 2012-175653 A | | 9/2012 | |
| JP | 2016-513940 A | | 5/2016 | |
| WO | WO2014136620 A1 | * | 9/2014 | |
| WO | WO-2020166031 A | * | 8/2020 | ............ H04W 52/18 |
| WO | WO2020166031 A1 | * | 8/2020 | |

OTHER PUBLICATIONS

"Cellular LTE—A Technologies for the Future Internet-of-Things: Physical Layer Features and Challenges", Mahmoud Elsaadany, Abdelmohsen Ali, IEEE Communications Surveys & Tutorials, vol. 19, No. 4, Dec. 2017 (Year: 2017).*

"IEEE Standard for Local and metropolitan area networks—Part 16: Air Interface for Broadband Wireless Access Systems Amendment 3: Advanced Air Interface" IEEE Computer Society and the IEEE Microwave Theory and Techniques Society, May 2011 (Year: 2011).*

J. Xu, J. Yao, L. Wang, Z. Ming, K. Wu and L. Chen, "Narrowband Internet of Things: Evolutions, Technologies, and Open Issues," in IEEE Internet of Things Journal, vol. 5, No. 3, pp. 1449-1462, Jun. 2018, doi: 10.1109/JIOT.2017.2783374. (Year: 2018).*

International Search Report dated Aug. 15, 2017 issued for corresponding PCT application No. PCT/JP2017/019538.

* cited by examiner

BASE STATION DEVICE, TERMINAL DEVICE, WIRELESS COMMUNICATION SYSTEM, AND RADIO RESOURCE INFORMATION NOTIFICATION METHOD

CROSS-REFERENCE TO RELATED APPLICATION

This application is a continuation application of International Application Number PCT/JP2017/019538 filed on May 25, 2017 and designated the U.S., the entire contents of which are incorporated herein by reference.

FIELD

The present invention relates to a base station device, a terminal device, a wireless communication system, and a radio resource information notification method.

BACKGROUND

Specifications of wireless communication standards are set by the standardization group 3GPPP, for example. Accordingly, a signal format of radio resources of next-generation (e.g., 5G (fifth generation mobile communication)) communication standards may differ from a signal format of radio resources of 4G (fourth generation mobile communication) communication standards.

A base station device determines a signal format according to regulations of communication standard specifications. For example, the base station device transmits a reference signal through which a terminal device measures channel quality in a signal format of radio resources which is prescribed in specifications. The prescribed signal format may vary depending on a release version of specifications. Accordingly, to cope with terminal devices (hereinafter, old terminal devices) that only support old release versions, the base station device transmits a reference signal using, for example, a signal format prescribed in a release version a predetermined number of versions before in addition to a signal format prescribed in a new release version.

Technologies with respect to base station devices are disclosed in Japanese Patent Application Publication No. 2010-136309 and Japanese Translation of PCT Application No. 2016-513940.

SUMMARY

According to an aspect of the embodiments, a base station device in a wireless communication system including a terminal device and a base station device that is wirelessly connected to the terminal device and transmits signals to the terminal device, the base station device includes, an acquirer which acquires a first version of a signal format corresponding to the terminal device, and a transmitter that transmits, to the terminal device, difference information relating to a signal used for a different purpose from a purpose of a signal of a second version corresponding to the base station device when the first version differs from the second version.

In a disclosure, it is possible to change specifications of radio resources without deteriorating communication quality of terminal devices.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Old terminal devices are not able to recognize a prescribed signal format when a reference signal is transmitted in a new release version. Accordingly, old terminal devices may recognize a signal format in which a reference signal is transmitted in a new release version as a signal including information other than the reference signal. For example, old terminal devices misrecognize a reference signal in a new version as user data such as audio and handle the reference signal as audio mixed with noise, and thus communication performance may degrade.

When specifications of a signal format of a new release version are determined such that the above-described misrecognition does not occur, for example, a problem that it is possible to use only signals (radio resources) which are not used in old release versions in a new release version, and the like occur, restricting determination of latest specifications.

First Embodiment

A first embodiment will be described.

Example of Configuration of Wireless Communication System

Figure 1:
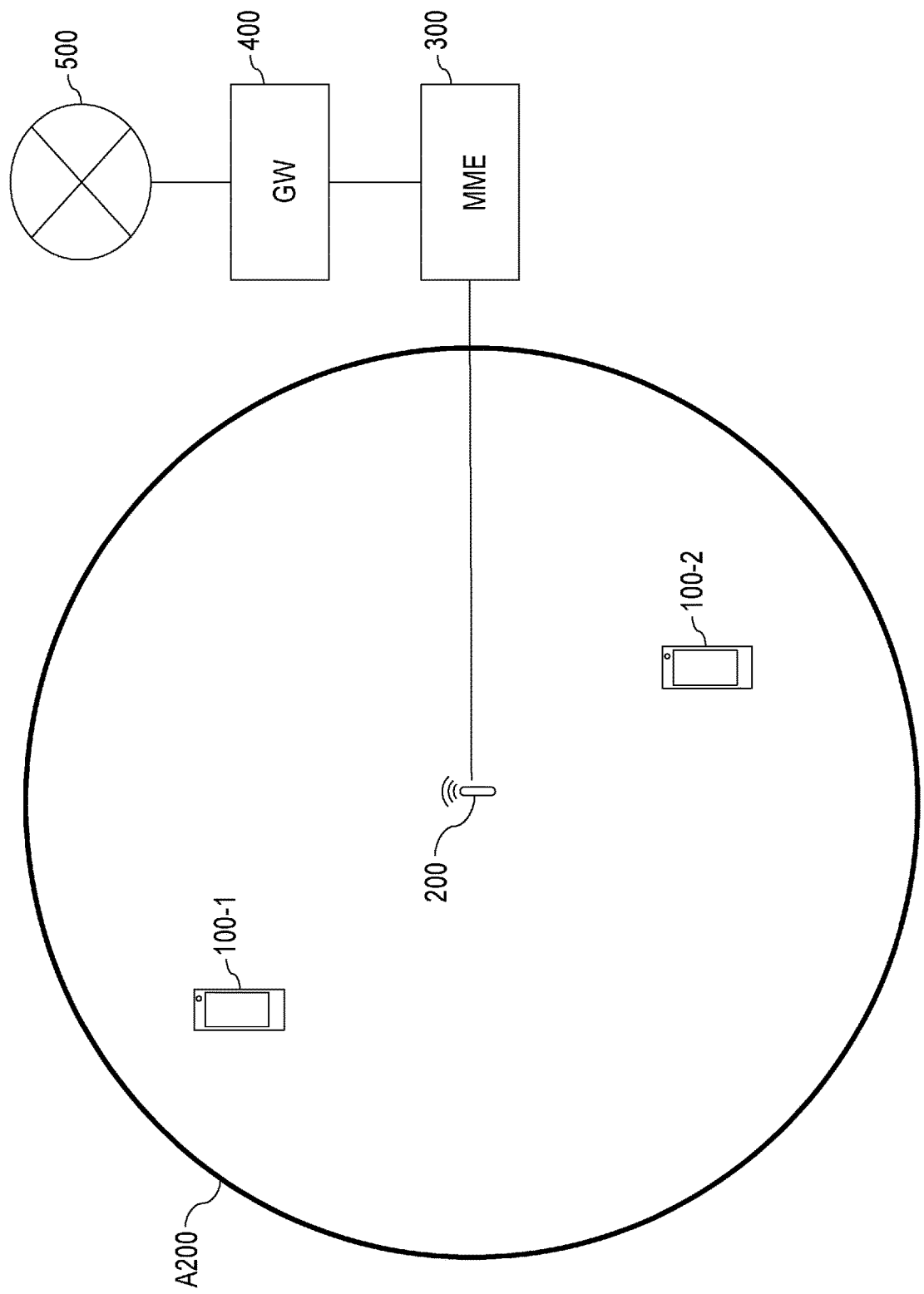
FIG. 1 is a diagram illustrating an example of a configuration of a wireless communication system 10.

FIG. 1 is a diagram illustrating an example of a configuration of a wireless communication system 10. The wireless communication system 10 includes terminal devices 100-1 and 100-2, a base station device 200, a mobility management entity (MME) 300, a gateway (GW) 400, and an external network 500. The wireless communication system 10 is, for example, a wireless communication system conforming to communication standards such as 4G and 5G.

The terminal devices 100-1 and 100-2 (which may hereinafter be referred to as a terminal device 100) are, for example, mobile communication devices such as smartphones and tablet terminals. The terminal device 100 is wirelessly connected to, for example, the base station device 200 and performs communication with an external network and other communication devices through the base station device 200. The terminal device 100 has an application or software (which may hereinafter be called as terminal default software) for execution of wireless communication. The terminal default software corresponds to (supports), for example, a release version (which may hereinafter be simply called a version) of LTE specifications in wireless communication systems conforming to LTE. The terminal default software is present for each corresponding (supporting) version, such as terminal default software corresponding to version xx (xx is a version number), for example. Further, the terminal device 100 may be called a version xx adaptive terminal in accordance with a version corresponding to the terminal default software of the terminal device 100. Hereinafter, a corresponding version of the terminal default software of the terminal device 100 may be called a corresponding version of the terminal device 100.

A signal format varies depending on the corresponding version of the terminal device 100. In a signal format, for example, an area carrying user data in a certain corresponding version may carry information for control in another corresponding version.

The base station device 200 is wirelessly connected to the terminal device 100 and relays communication performed by the terminal device 100. The base station device 200 has a communication area A200. The communication area is a range in which the base station device 200 is wirelessly connectable to the terminal device 100. The base station device 200 is, for example, an eNode B in communication systems conforming to LTE. Although there is one base station device 200 in the wireless communication system 10 of FIG. 1, a plurality of base station devices 200 may be present. Further, the base station device 200 has an application or software (which may hereinafter be called base station default software) which relays communication of the terminal device 100. The base station default software is present for each corresponding version like the terminal default software. When the wireless communication system 10 includes a plurality of base station devices 200, it is desirable that the respective base station devices 200 have base station default software of the same corresponding version. The base station device 200 may be called a version xx adaptive base station in accordance with a corresponding version of the base station default software of the base station device 200. Hereinafter, a corresponding version of the base station default software of the base station device 200 may be called a corresponding version of the base station device 200.

The MME 300 is a device which manages the base station device 200 and is a computer or a server machine, for example. The MME 300 performs management of movement of the terminal device 100 within the communication area of the base station device 200 and security control such as authentication. In addition, the MME 300 controls a data transfer path between the GW 400 and the base station device 200. The MME 300 is connected to the GW 400 and the base station device 200, for example, in a wired manner such as through optical lines.

The GW 400 is a gateway device which converts a protocol in communication between the MME 300 and the base station device 200 and the external network 500. The GW 400 is, for example, a packet data network-gateway (P-GW) for performing communication with the external network 500. In addition, the GW 400 is, for example, a serving gateway (S-GW) which transmits user data. Otherwise, the GW 400 may be a gateway device having gateway functions of both the P-GW and the S-GW. Further, the MME 300 may have, for example, the function of the S-GW.

The external network 500 is a network other than a core network including the terminal device 100, the base station device 200, the MME 300 and the GW 400 and is the Internet, for example. The external network 500 includes a communication device which performs communication with the terminal device 100, such as a mobile communication terminal or a data server.

In the first embodiment, when the corresponding version of the terminal device 100 differs from the corresponding version of the base station device 200, the base station device 200 transmits, to the terminal device 100, difference information relating to signals (radio resources) used for a different purpose from that of the corresponding version of the terminal device 100 in the corresponding version of the base station device 200.

The difference information is, for example, information relating to radio resources which are used for user data in the corresponding version of the terminal device 100 but used for control data in a newer version. That is, the terminal device 100 can determine radio resources which will be discarded (or will not be received) on the basis of the difference information.

Example of Configuration of Base Station Device

Figure 2:
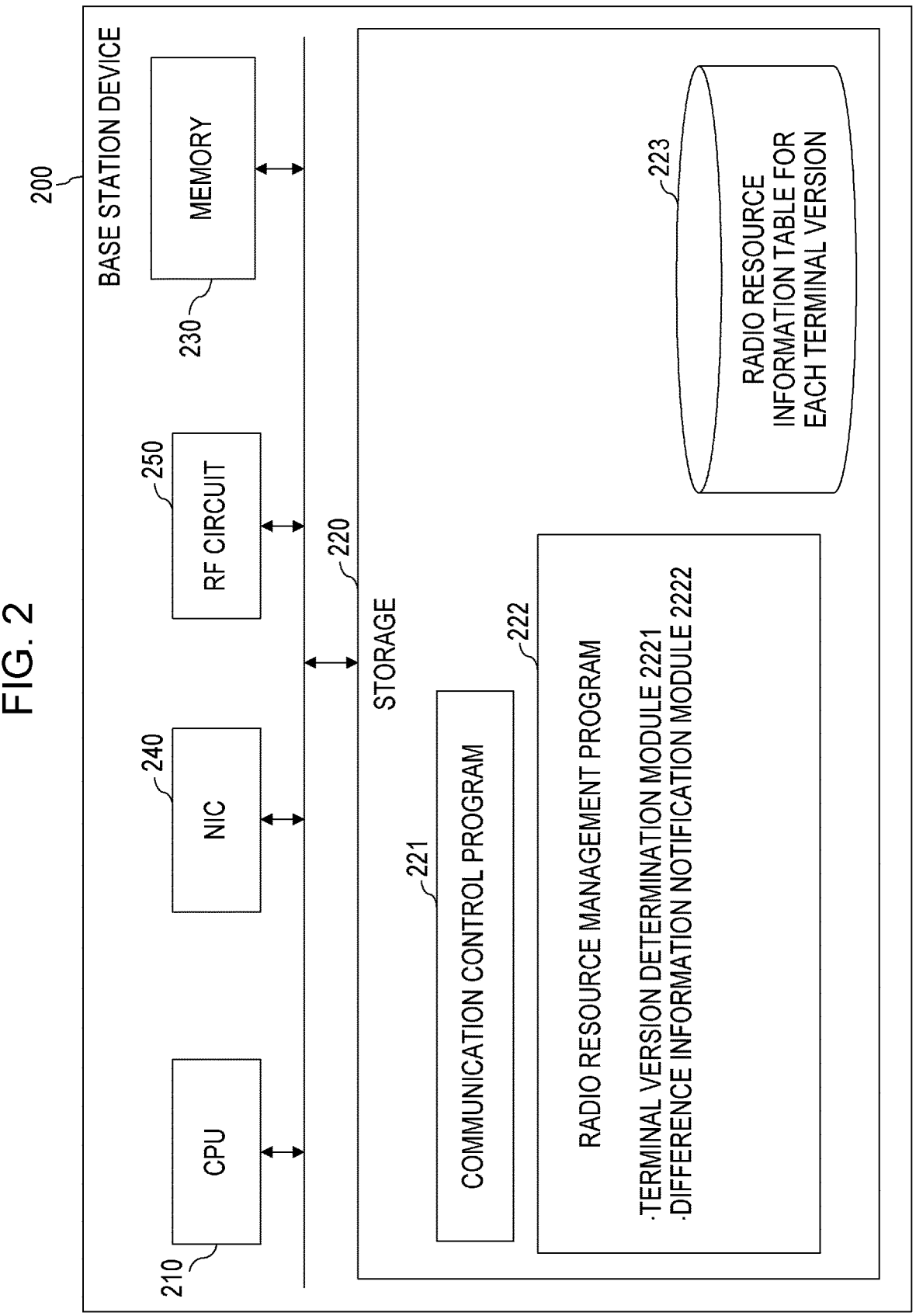
FIG. 2 is a diagram illustrating an example of a configuration of the base station device 200.

FIG. 2 is a diagram illustrating an example of a configuration of the base station device 200. The base station device 200 includes a central processing unit (CPU) 210, a storage 220, a memory 230 such as a dynamic random access memory (DRAM), a network interface card (NIC) 240, and a radio frequency (RF) circuit 250.

The storage 220 is an auxiliary storage device such as a flash memory, a hard disk drive (HDD) or a solid state drive (SSD) which stores programs and data. The storage 220 stores a communication control program 221, a radio resource management program 222, and a radio resource information table 223 for each terminal version.

The radio resource information table 223 for each terminal version is a table storing information relating to radio resources for each corresponding version of a terminal device. When a subframe carrying user data in a specific version and following versions has changed to a subframe carrying control information, for example, the radio resource information table 223 for each terminal version stores the specific version and the number of the subframe configured to carry the control information. The base station device 200 generates difference information with reference to the radio resource information table 223 for each terminal version. In addition, the radio resource information table 223 for each terminal version may store, for example, the number of a subframe for a different purpose from that of radio resources of a corresponding version (an available new version) of the base station device 200. Further, the radio resource information table 223 for each terminal version may store, for example, difference information corresponding to a corresponding version of the terminal device 100.

The memory 230 is a region in which a program stored in the storage 220 is loaded. In addition, the memory 230 is also used as a region in which a program stores data.

The NIC 240 is a network interface connected to the external network 500 through other base station devices 200, the MME 300 and the GW 400. The base station device 200 relays communication of the terminal device 100 by transmitting/receiving packets to/from other communication devices and the external network 500 through the NIC 240.

The RF circuit 250 is a device wirelessly connected to the terminal device 100. The RF circuit 250 includes, for example, an antenna and realizes transmission/reception of packets including data to/from the terminal device 100 by transmitting/receiving signals (radio waves) to/from the wirelessly connected terminal device 100.

The CPU 210 performs communication control processing by executing the communication control program 221. The communication control processing is processing of relaying communication performed by the terminal device 100. The base station device 200 transmits, for example, packets received from the terminal device 100 to a packet transmission destination in the communication control processing. In addition, when the base station device 200 receives packets destined for the terminal device 100, for example, the base station device 200 transmits the received packets to the terminal device 100 in the communication control processing. Meanwhile, the communication control program 221 is, for example, base station default software and the version of the communication control program may be the corresponding version of the base station device 200.

The CPU 210 constructs an acquirer and a transmitter and performs a radio resource management processing by executing the radio resource management program 222. The radio resource management processing is processing of monitoring radio resources used for wireless communication with the terminal device 100. The radio resource management processing includes terminal version determination processing and difference information notification processing which are subroutines.

In addition, the CPU 210 constructs the acquirer and performs the terminal version determination processing by executing a terminal version determination module 2221 included in the radio resource management program 222. The terminal version determination processing is processing of comparing the corresponding version of the terminal device 100 which will perform wireless communication to the corresponding version of the base station device 200 and determining whether the terminal device 100 needs to be notified of difference information.

In addition, the CPU 210 constructs the transmitter and performs the difference information notification processing by executing a difference information notification module 2222 included in the radio resource management program 222. The difference information notification processing is processing of notifying the terminal device 100 which will perform wireless communication of difference information. The base station device 200 introduces the difference information in, for example, a radio resource control (RRC) message to be used for allocation of radio resources and transmits the RRC message to the terminal device 100. RRC is a layer in wireless communication. A layer is, for example, a stratum classified according to a wireless communication function and specifications thereof are prescribed as a protocol stack. The RRC layer is a layer which controls radio resources. The RRC message includes, for example, a request and a response for establishing connection in the RRC layer and a radio resource allocation message. Meanwhile, although the base station device 200 introduces the difference information in the RRC message in the difference information notification processing, for example, messages in other layers may be used or a dedicated message for notification of the difference information may be used.

Example of Configuration of Terminal Device

Figure 3:
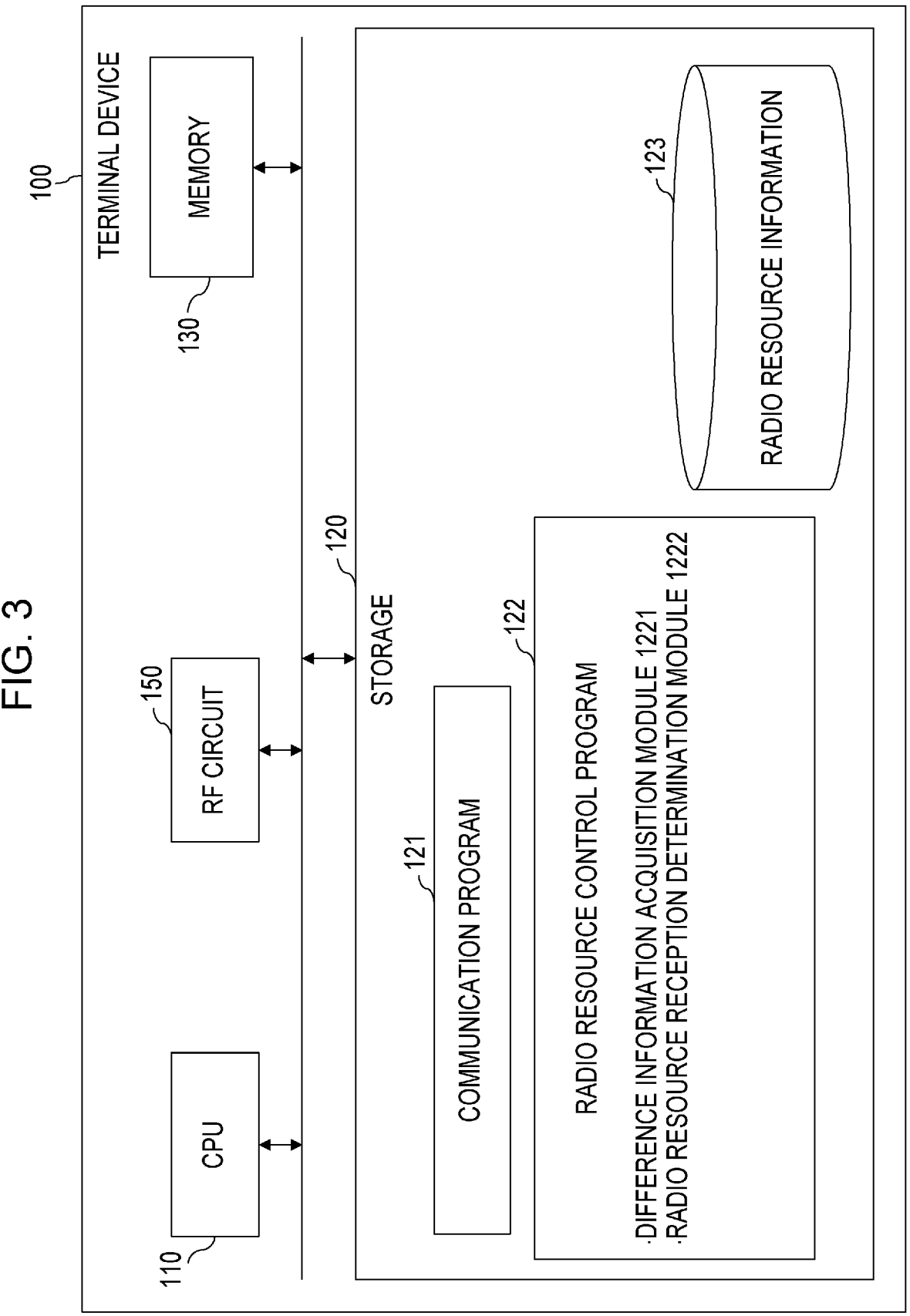
FIG. 3 is a diagram illustrating an example of a configuration of the terminal device 100.

FIG. 3 is a diagram illustrating an example of a configuration of the terminal device 100. The terminal device 100 includes a CPU 110, a storage 120, a memory 130 such as a DRAM, and an RF circuit 150.

The storage 120 is an auxiliary storage device such as a flash memory, an HDD or an SSD which stores programs and data. The storage 120 stores a communication program 121, a radio resource control program 122, and radio resource information 123.

The radio resource information 123 is a region storing radio resource information (difference information) corresponding to the corresponding version of the terminal device 100. When the terminal device 100 receives difference information from the base station device 200, the terminal device 100 updates the radio resource information 123.

The CPU 110 performs communication processing by executing the communication program 121. The communication processing is processing of performing communication with the external network 500 and other communication devices through the base station device 200. The terminal device 100 transmits packets to a communication device of a communication counterpart through, for example, the base station device 200 in the communication processing. In addition, the terminal device 100 receives packets from the communication device of the communication counterpart through, for example, the base station device 200 in the communication processing. Meanwhile, the communication program 121 is, for example, base station default software and the version of the communication program is the corresponding version of the terminal device 100.

The CPU 110 constructs a receiver and a difference transmitter and performs radio resource control processing by executing the radio resource control program 122. The radio resource control processing is processing of receiving difference information from the base station device 200 and discarding a received signal (or a part of the signal) on the basis of the received difference information. The radio resource control processing includes difference information acquisition processing and radio resource reception determination processing as subroutines.

In addition, the CPU 110 constructs the receiver and performs the difference information acquisition processing by executing a difference information acquisition module 1221 included in the radio resource control program 122. The difference information acquisition processing is processing of extracting and storing difference information included in a message received from the base station device 200.

In addition, the CPU 110 constructs the difference controller and performs the radio resource reception determination processing by executing a radio resource reception determination module 1222 included in the radio resource control program 122. The radio resource reception determination processing is processing of determining whether to discard a signal (or a part of the signal) received from the base station device 200. Meanwhile, although the terminal device 100 discards a signal or a part of the signal in the radio resource reception determination processing, for example, the terminal device 100 may perform processing other than discarding in response to a received signal.

Signal Transmission/Reception Processing

Figure 4:
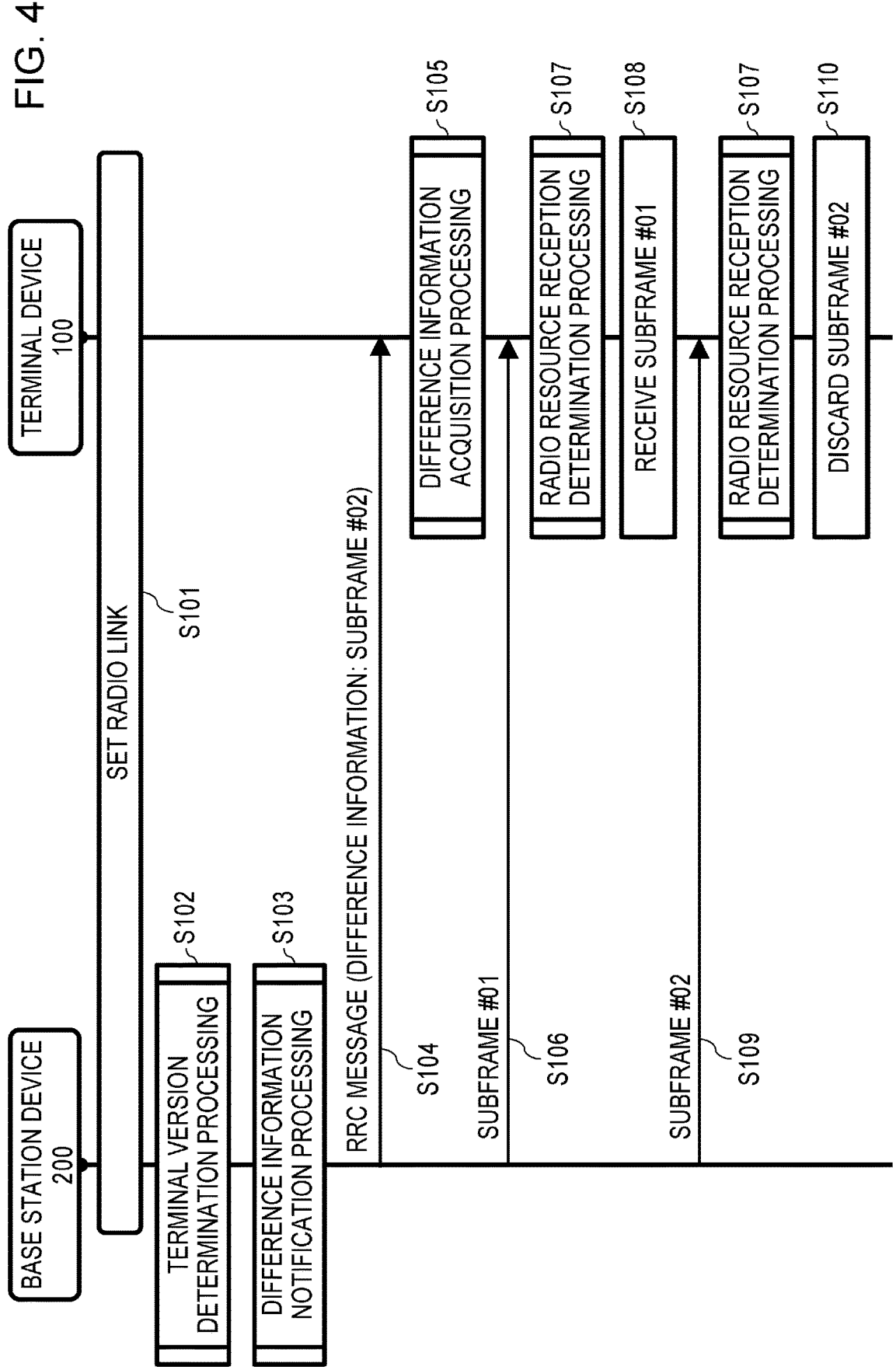
FIG. 4 is a diagram illustrating an example of a signal transmission/reception processing sequence in the wireless communication system 10.

FIG. 4 is a diagram illustrating an example of a signal transmission/reception processing sequence in the wireless communication system 10. Further, signals transmitted and received between the base station device 200 and the terminal device 100 are RRC messages and subframes (e.g., a physical downlink control channel (PDCCH)) in FIG. 4.

The terminal device 100 and the base station device 200 are wirelessly connected to each other (S101). The base station device 200 performs the terminal version determination processing when the corresponding version (a first version) of the terminal device 100 is acquired (S102).

Figure 5:
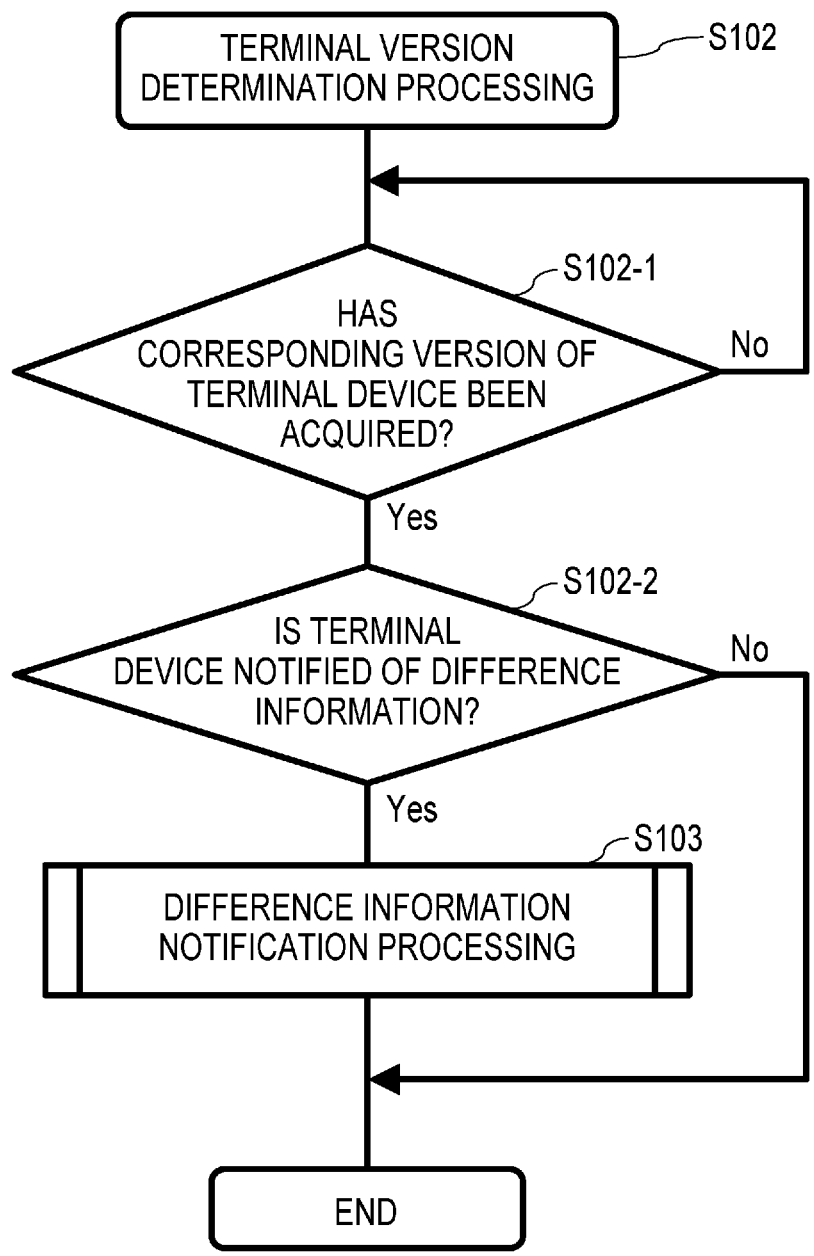
FIG. 5 is a diagram illustrating a processing flowchart of the terminal version determination processing S102.

FIG. 5 is a diagram illustrating a processing flowchart of the terminal version determination processing S102. The base station device 200 waits to acquire the corresponding version of the terminal device 100 (No in S102-1).

The base station device 200 determines whether to notify the terminal device 100 of difference information (S102-2) when the corresponding version of the terminal device 100 is acquired (Yes in S102-1). When the corresponding version (a second version) of the base station device 200 differs from the corresponding version of the terminal device 100, for example, the base station device 200 determines that the terminal device 100 will be notified of the difference information. In addition, even when the corresponding version of the base station device 200 differs from the corresponding version of the terminal device 100, for example, the base station device 200 determines that the terminal device 100 will not be notified of the difference information when there is no difference between signal formats (radio resources).

The base station device 200 performs the difference information notification processing (S103) when it is determined that the terminal device 100 will be notified of the difference information (Yes in S102-2). On the other hand, the base station device 200 ends the processing without notifying the terminal device 100 of the difference information when it is determined that the terminal device 100 will not be notified of the difference information (No in S102-2).

Meanwhile, the base station device 200 performs the terminal version determination processing S102 whenever a corresponding version of each of a plurality of terminal devices 100 is acquired. Accordingly, the base station device 200 causes, for example, a terminal device 100 which does not need to discard subframes (e.g., a terminal device corresponding to a new version) not to discard subframes that are targets to be discarded in other corresponding versions.

Returning to the sequence of FIG. 4, the base station device 200 determines that the terminal device 100 will be notified of the difference information (Yes in S102-2 of FIG. 5) in the terminal version determination processing S102 and performs the difference information notification processing (S103).

Figure 6:
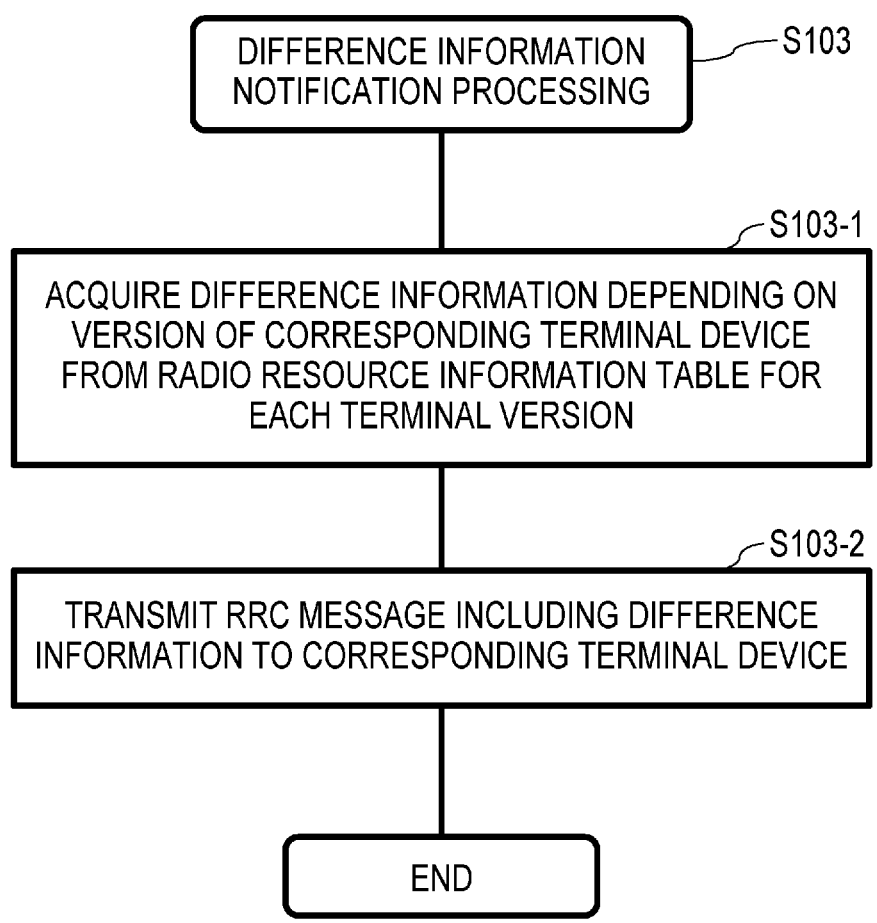
FIG. 6 is a diagram illustrating an example of a processing flowchart of the difference information notification processing S103.

FIG. 6 is a diagram illustrating an example of a processing flowchart of the difference information notification processing S103. The base station device 200 acquires difference information depending on the corresponding version of the terminal device 100 from the radio resource information table 223 for each terminal version (S103-1). For example, when a subframe used for transmission and reception of user data in the corresponding version of the terminal device 100 is used for transmission and reception of control information in the corresponding version of the base station device 200, the difference information is the number of the subframe. Then, the base station device 200 transmits an RRC message including the difference information to the terminal device 100 (S103-2). That is, when the number of the subframe is transmitted to the terminal device 100 as the difference information, the terminal device 100 can perform processing (e.g., discarding) depending on the purpose of the subframe without acquiring the subframe as user information.

Returning to the sequence of FIG. 4, the base station device 200 transmits the RRC message including the difference information to the terminal device 100 in the difference information notification processing S103 (S104 and S103-2 of FIG. 6). For example, subframe number 02 is transmitted as the difference information. Hereinafter, a subframe having a subframe number x (x is an integer) may be represented as subframe #x.

The terminal device 100 performs the difference information acquisition processing when the RRC message is received (S105).

Figure 7:
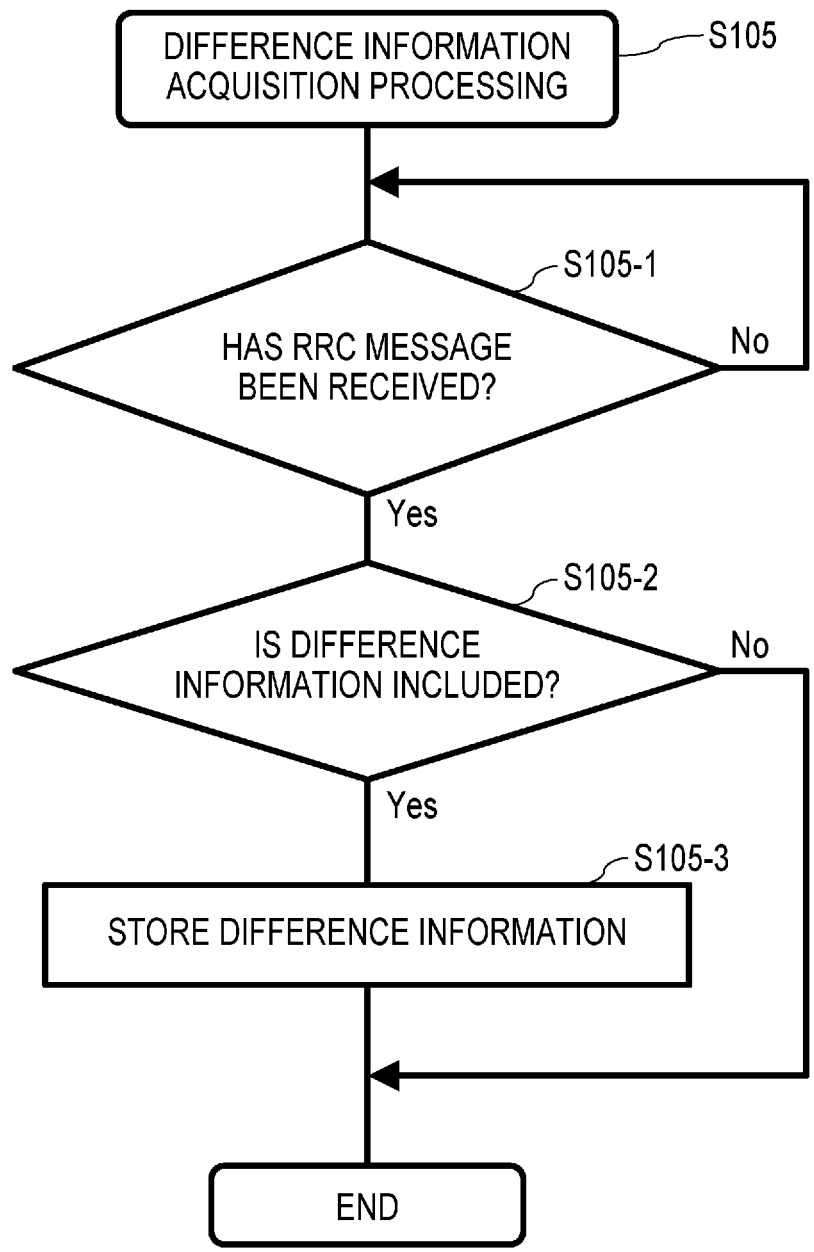
FIG. 7 is a diagram illustrating an example of a processing flowchart of the difference information acquisition processing S105.

FIG. 7 is a diagram illustrating an example of a processing flowchart of the difference information acquisition processing S105. The terminal device 100 waits to receive an RRC message (No in S105-1). The terminal device 100 checks whether the RRC message includes the difference information (S105-2) when the RRC message is received (Yes in S105-1). The terminal device 100 shares the fact that the difference information is included at a specific position in data and a header portion of the RRC message with the base station device 200 in advance. Accordingly, the terminal device 100 can acquire the difference information.

The terminal device 100 stores the difference information in an internal memory (S105-3) when the difference information is included (Yes in S105-2). On the other hand, the terminal device 100 ends the processing when the difference information is not included (No in S105-2).

Returning to the sequence of FIG. 4, the terminal device 100 acquires the difference information in the difference information acquisition processing S105. The terminal device 100 stores subframe #02 (subframe number 02) as the difference information (S105-3 of FIG. 7). Here, the terminal device 100 stores subframe #02 as a subframe to be discarded (or to be processed according to a signal).

Then, the terminal device 100 receives subframe #01 (S106). The terminal device 100 performs the radio resource reception determination processing when the subframe is received (S107).

Figure 8:
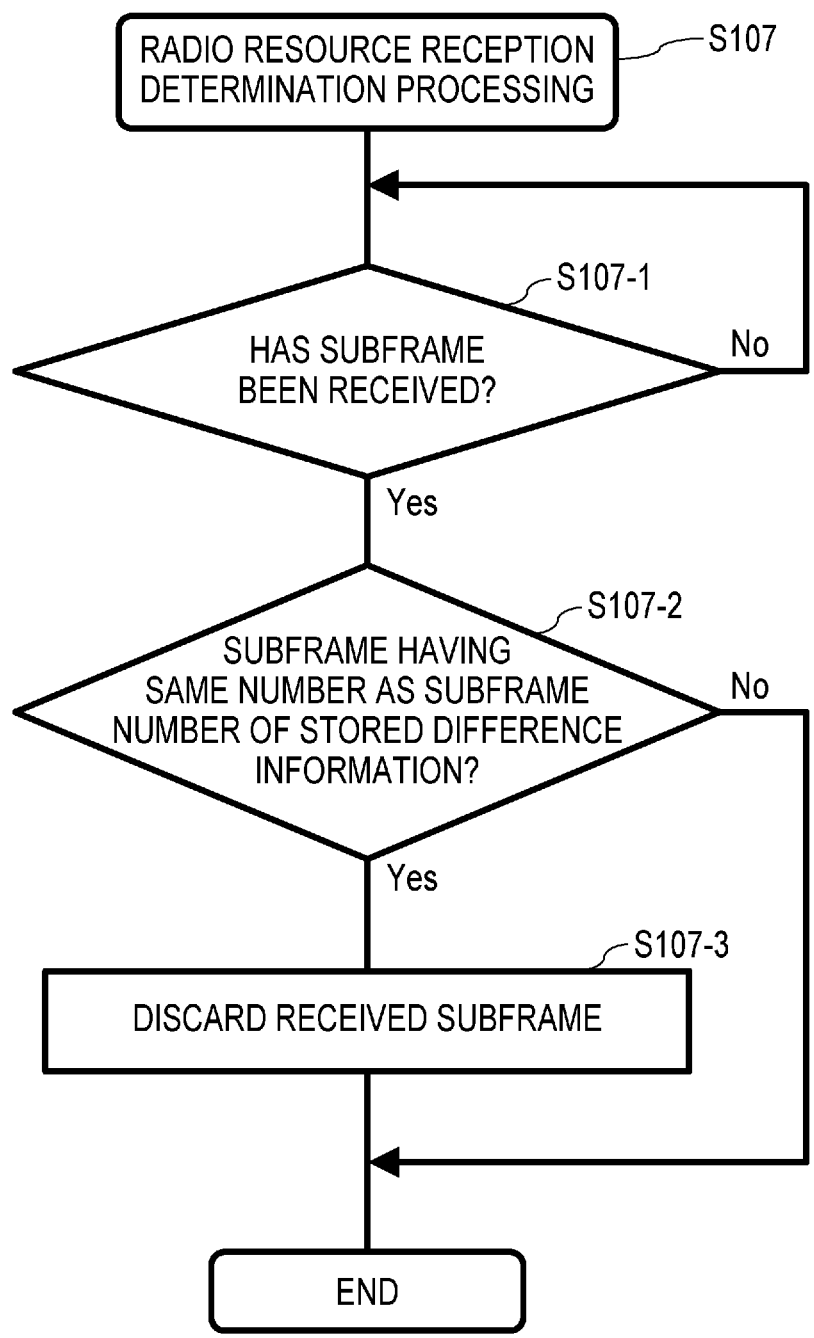
FIG. 8 is a diagram illustrating an example of a processing flowchart of the radio resource reception determination processing S107.

FIG. 8 is a diagram illustrating an example of a processing flowchart of the radio resource reception determination processing S107. The terminal device 100 waits to receive a subframe (No in S107-1). When a subframe is received (Yes in S107-1), the terminal device 100 determines whether the subframe number of the stored difference information is the same as the number of the received subframe (S107-2).

When a subframe having the same number as the subframe of the difference information is received (Yes in S107-2), the terminal device 100 discards the received subframe (S107-3). Meanwhile, the terminal device 100 may perform processing depending on details of the received subframe or predetermined processing instead of the discarding processing S107-3.

On the other hand, when a subframe having a number that is not the same as that of the subframe of the difference information is received (No in S107-2), the terminal device 100 ends the processing and performs processing according to the received subframe.

Returning to the sequence of FIG. 4, when subframe #01 is received, the terminal device 100 determines that subframe #01 is not a subframe having the same number as that of the stored difference information (subframe #02) (No in S107-2 of FIG. 8) in the radio resource reception determination processing S107 and receives subframe #01 (S108).

Then, when subframe #02 is received (S109), the terminal device 100 determines that subframe #02 is the subframe having the same number as that of the stored difference information (subframe #02) (Yes in S107-2 of FIG. 8) in the radio resource reception determination processing S107 and discards subframe #02 (S110 and S107-3 of FIG. 8).

Figure 9:
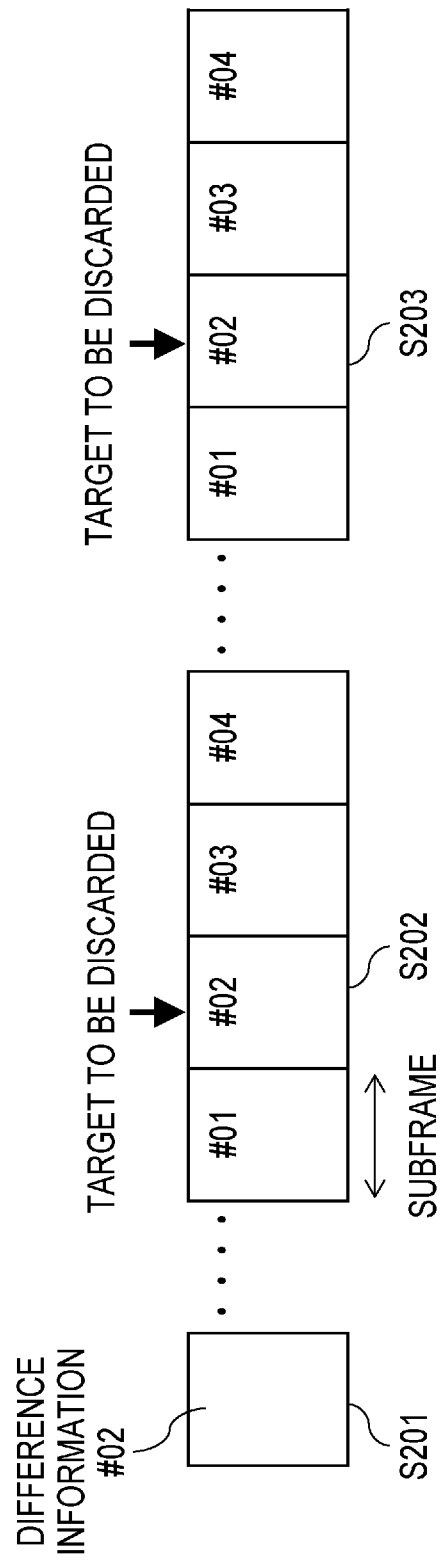
FIG. 9 is a diagram illustrating an example of processing when the terminal device 100 has received a subframe.

FIG. 9 is a diagram illustrating an example of processing when the terminal device 100 has received a subframe. The terminal device 100 receives subframe number 02 as difference information (S201). Then, the terminal device 100 discards subframe #02 after the difference information is received (S202 and S203). Subframe #02 discarded by the terminal device 100 becomes a target to be discarded not only in the initial reception after reception of the difference information (S202) but also in the second reception and thereafter (S203).

In the first embodiment, the base station device 200 transmits difference information to the terminal device 100 having a different corresponding version. Then, the terminal device 100 stores a subframe number indicated by the difference information and discards the subframe having the subframe number. Accordingly, even when a subframe used to transmit user data in the corresponding version of the terminal device 100 is changed such that the subframe is used to transmit a control signal in a new version, for example, it is possible to prevent deterioration of reception quality due to the terminal device 100 misrecognizing the control signal included in the subframe as user data.

The terminal device 100 having the same corresponding version as that of the base station device 200 does not discard a subframe that is a target to be discarded in other versions because the terminal device 100 does not receive difference information. In this manner, for example, a terminal device 100 of a new version can receive a subframe in accordance with the new version and a terminal device 100 of an old version can discard a subframe whose purpose has been changed in the new version, and thus the quality of the terminal device 100 of the old version does not deteriorate even when the terminal devices 100 of the new and old versions are both present in a communication system.

Furthermore, in the first embodiment, a processing load in subframe transmission does not increase because no new information is added to a subframe.

Second Embodiment

Next, a second embodiment will be described. In the second embodiment, difference information is not transmitted through an RRC message and information indicating that a subframe is a target to be discarded is added to the subframe (e.g., a header portion). The terminal device 100 determines whether a subframe is a target to be discarded whenever a subframe is received.

Example of Configuration of Base Station Device

Figure 10:
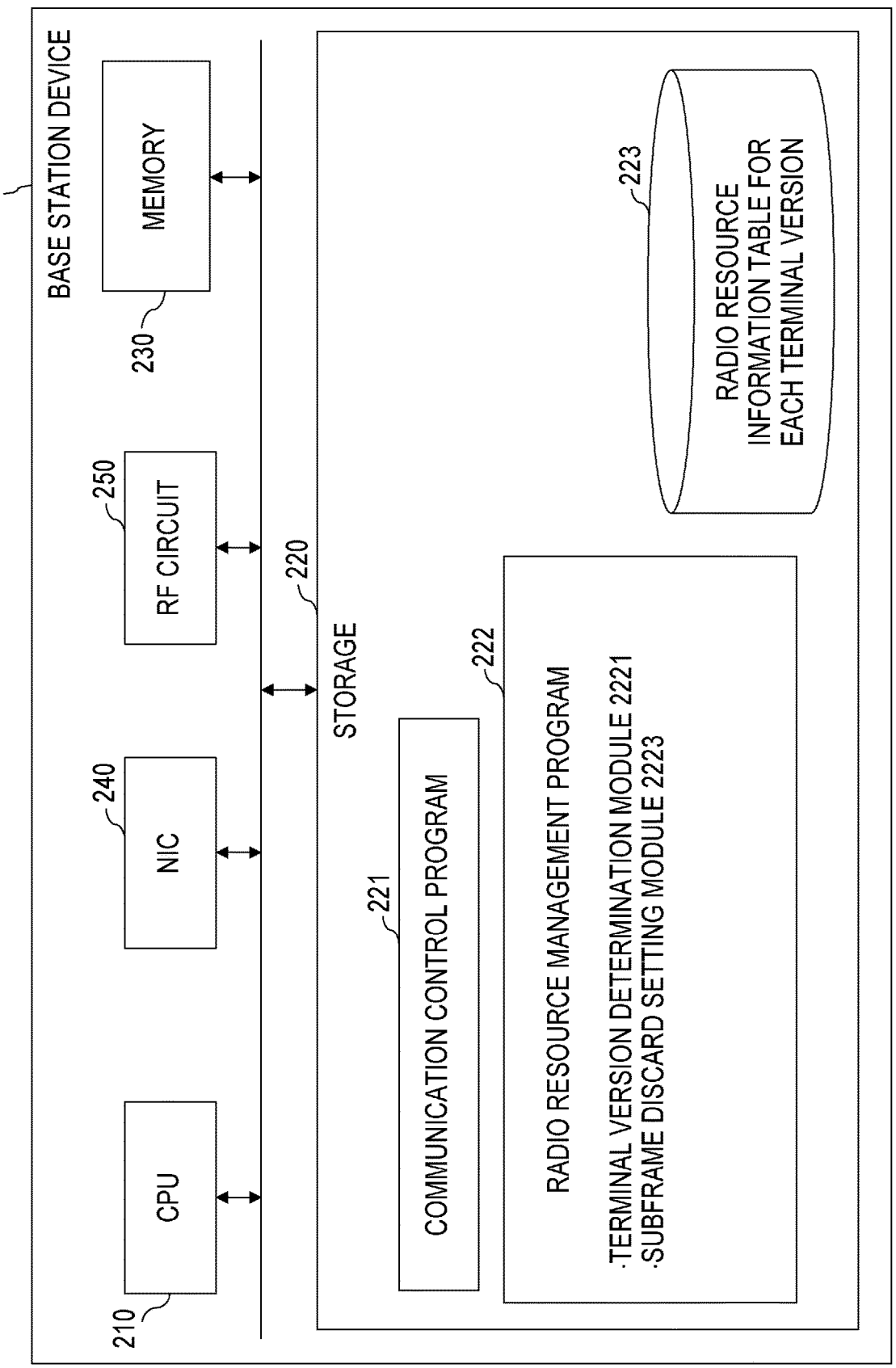
FIG. 10 is a diagram illustrating an example of a configuration of the base station device 200.

FIG. 10 is a diagram illustrating an example of a configuration of the base station device 200. The base station device 200 stores a subframe discard setting module 2223 in the radio resource management program 222 of the storage 220.

The CPU 210 constructs the receiver and performs subframe discard setting processing by executing the subframe discard setting module 2223 included in the radio resource management program 222. The subframe discard setting processing is processing of adding, to a subframe indicated to be discarded (to be discarded) by the terminal device 100, information indicating that the subframe is a target subframe to be discarded.

Signal Transmission/Reception Processing

Figure 11:
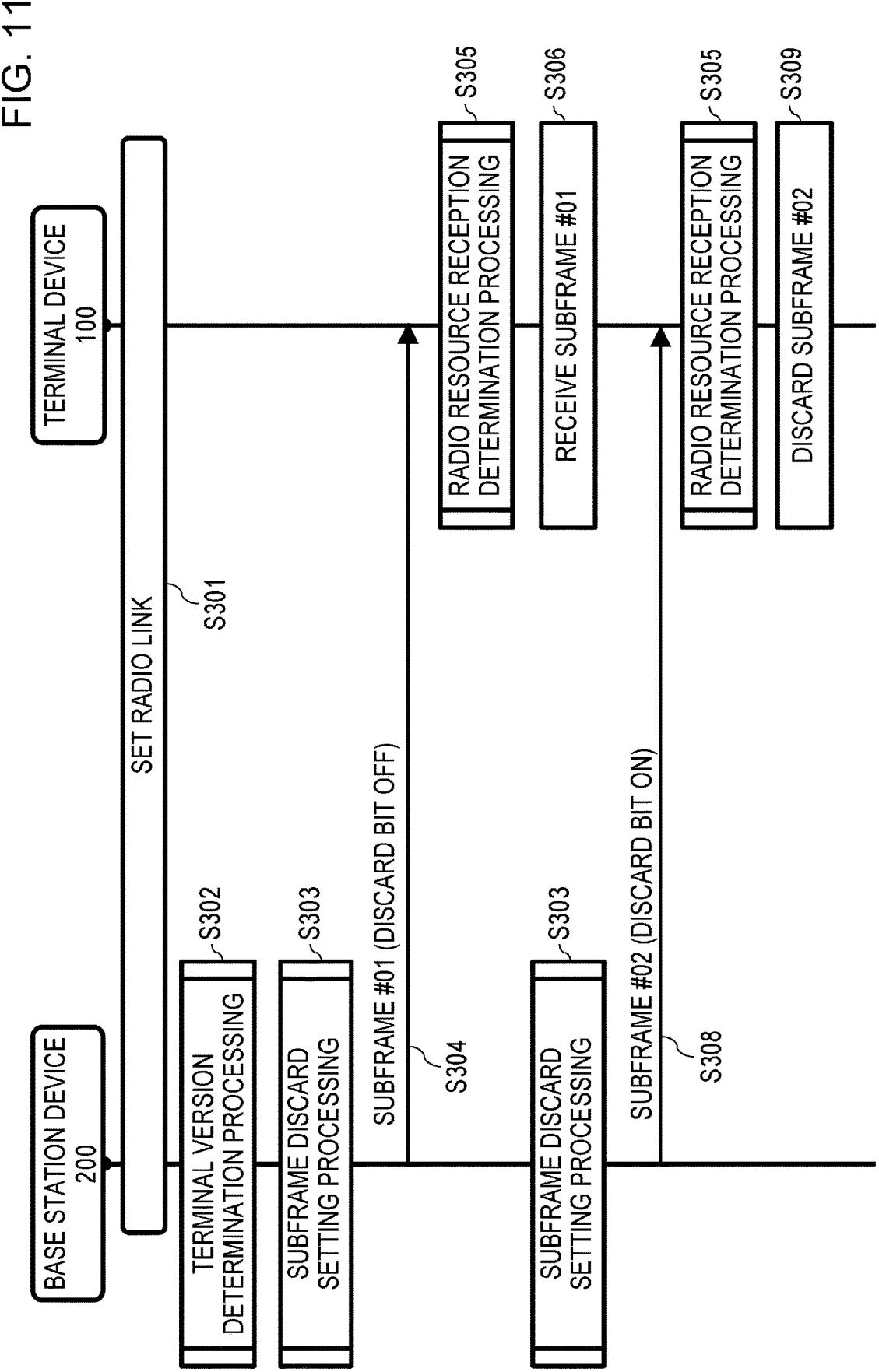
FIG. 11 is a diagram illustrating an example of signal transmission/reception processing sequence in the wireless communication system 10.

FIG. 11 is a diagram illustrating an example of signal transmission/reception processing sequence in the wireless communication system 10. The terminal device 100 and the base station device 200 are wirelessly connected to each other (S301). The base station device 200 performs the terminal version determination processing when the corresponding version of the terminal device 100 is acquired (S302).

Figure 12:
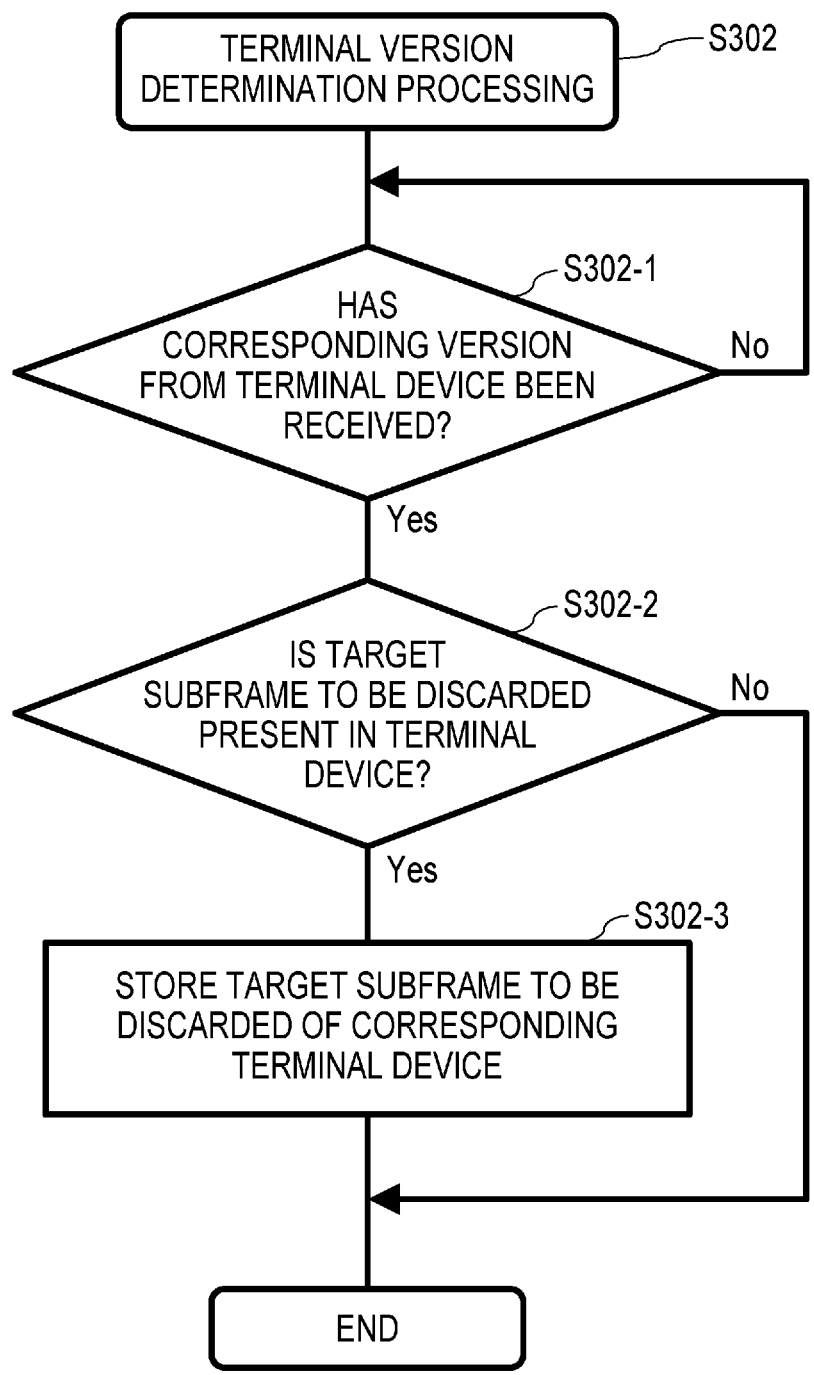
FIG. 12 is a diagram illustrating an example of a processing flowchart of the terminal version determination processing S302.

FIG. 12 is a diagram illustrating an example of a processing flowchart of the terminal version determination processing S302. The base station device 200 waits to acquire the corresponding version of the terminal device 100 (No in S302-1).

The base station device 200 determines presence or absence of a subframe that is a target to be discarded in the terminal device 100 (S302-2) when the corresponding version of the terminal device 100 is acquired (Yes in S302-1). When the corresponding version of the base station device 200 differs from the corresponding version of the terminal device 100, for example, the base station device 200 determines that a subframe that is a target to be discarded is present in the terminal device 100. Even when the corresponding version of the base station device 200 differs from the corresponding version of the terminal device 100, for example, the base station device 200 determines that a subframe that is a target to be discarded is not present in the terminal device 100 when there is no difference between signal formats (radio resources).

When it is determined that a subframe that is a target to be discarded is present in the terminal device 100 (Yes in S302-2), the base station device 200 stores the subframe number of the subframe that is a target to be discarded of the terminal device 100 (S302-3). On the other hand, when it is determined that a subframe that is a target to be discarded is not present in the terminal device 100 (No in S302-2), the base station device 200 ends the processing.

Returning to the sequence of FIG. 11, the base station device 200 determines that a subframe that is a target to be discarded is present in the terminal device 100 (Yes in S302-2 of FIG. 12) in the terminal version determination processing S102 and stores the subframe number (e.g., #02) of the target to be discarded (S302-3 of FIG. 12).

Then, the base station device 200 performs the subframe discard setting processing when transmitting the subframe to the terminal device 100 (S303).

Figure 13:
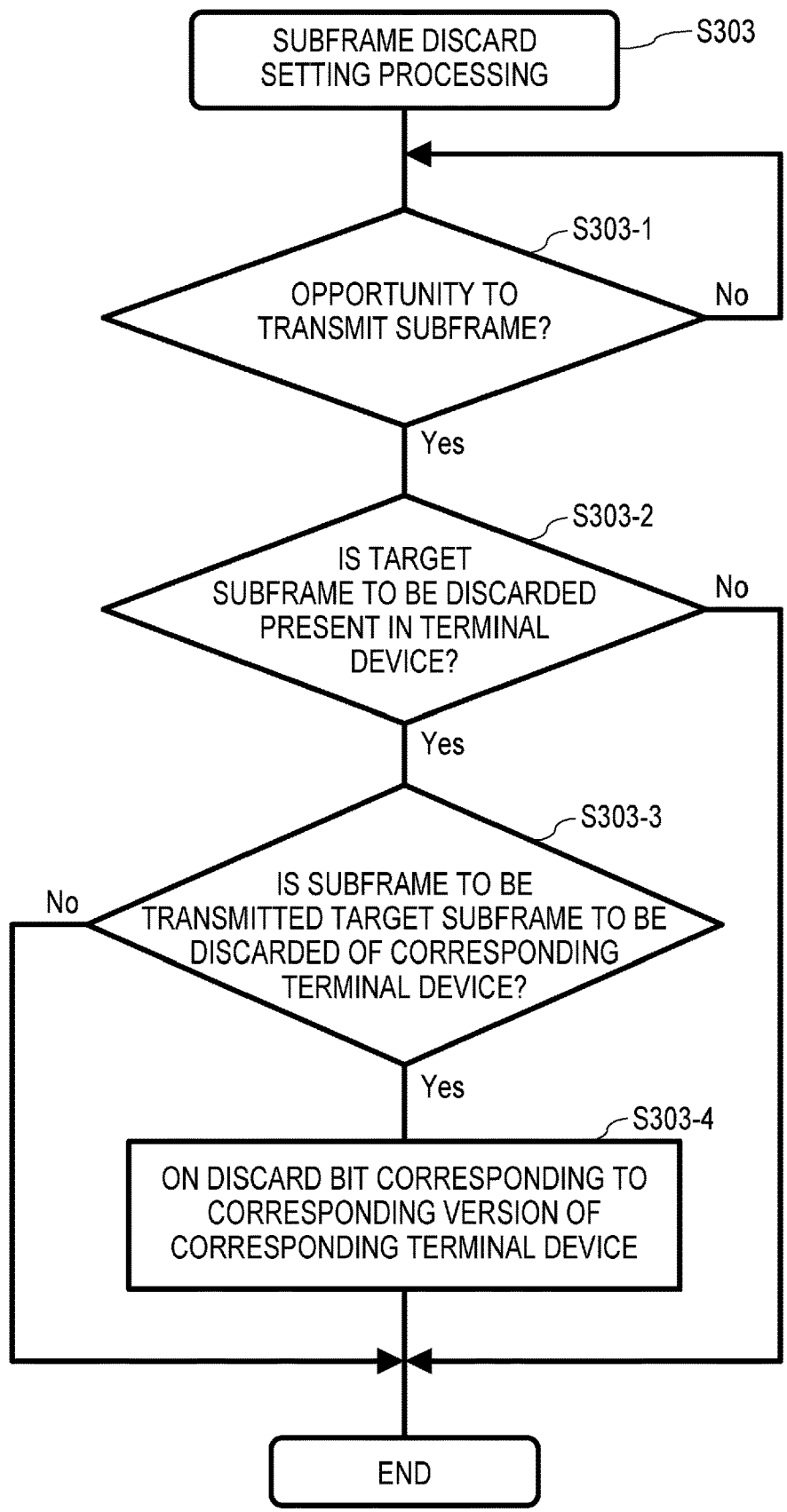
FIG. 13 is a diagram illustrating an example of a processing flowchart of the subframe discard setting processing S303.

FIG. 13 is a diagram illustrating an example of a processing flowchart of the subframe discard setting processing S303. The base station device 200 waits for an opportunity to transmit a subframe (No in S303-1). When an opportunity to transmit a subframe occurs (Yes in S303-1), the base station device 200 determines presence or absence of a subframe that is a target to be discarded in the terminal device 100 of a transmission destination (S303-2). The base station device 200 determines presence or absence of a subframe that is a target to be discarded, for example, by checking presence or absence of the subframe number stored in the processing S302-3 of FIG. 12.

When a subframe that is a target to be discarded is present in the terminal device 100 (Yes in S303-2), the base station device 200 determines whether the subframe to be transmitted is a subframe having the subframe number of the target to be discarded of the terminal device 100 (S303-3). On the other hand, when a subframe that is a target to be discarded is not present in the terminal device 100 (No in S303-2), the base station device 200 transmits the subframe without setting a discard bit to ON. The discard bit is, for example, a bit present for each corresponding version of the terminal device 100. The terminal device 100 checks a discard bit corresponding to the corresponding version thereof, and when the discard bit is ON, recognizes a corresponding subframe as a target to be discarded. The terminal device 100 can perform discarding or reception depending on a corresponding version by setting a discard bit for each corresponding version. Meanwhile, the discard bit set to ON indicates that the corresponding version of the base station device 200 differs from the corresponding version of the terminal device 100, that is, the discard bit is one form of difference information. The discard bit is discard information for instructing the terminal device 100 to discard a corresponding frame when set to ON.

When a subframe that is a target to be discarded is present in the terminal device 100 (Yes in S303-2) and the subframe number of the target to be discarded of the terminal device 100 is the same as the number of the subframe to be transmitted (Yes in S303-3), the base station device 200 sets a discard bit of the subframe to be transmitted, which corresponds to the corresponding version of the terminal device 100, to ON (S303-4).

On the other hand, when the subframe number of the target to be discarded of the terminal device 100 is not the same as the number of the subframe to be transmitted (No in S303-3), the base station device 200 transmits the subframe without setting the discard bit to ON.

Meanwhile, when a plurality of terminal devices 100 are subordinate to (served by) the base station device 200, the base station device 200 performs the subframe discard setting processing S303 on all subordinate terminal devices 100. The base station device 200 determines whether or not to set a discard bit to ON for each of a plurality of terminal devices of a plurality of corresponding versions, for example, and sets only a discard bit corresponding to a version that is a target to be discarded to ON such that a terminal device 100 which may not need to discard subframes (e.g., a terminal device corresponding to a new version) does not discard a corresponding subframe.

Returning to the sequence of FIG. 11, the base station device 200 transmits subframe #01 without setting the discard bit corresponding to the corresponding version of the terminal device 100 to ON (S304). The terminal device 100 which has received subframe #01 performs the radio resource reception determination processing (S305).

Figure 14:
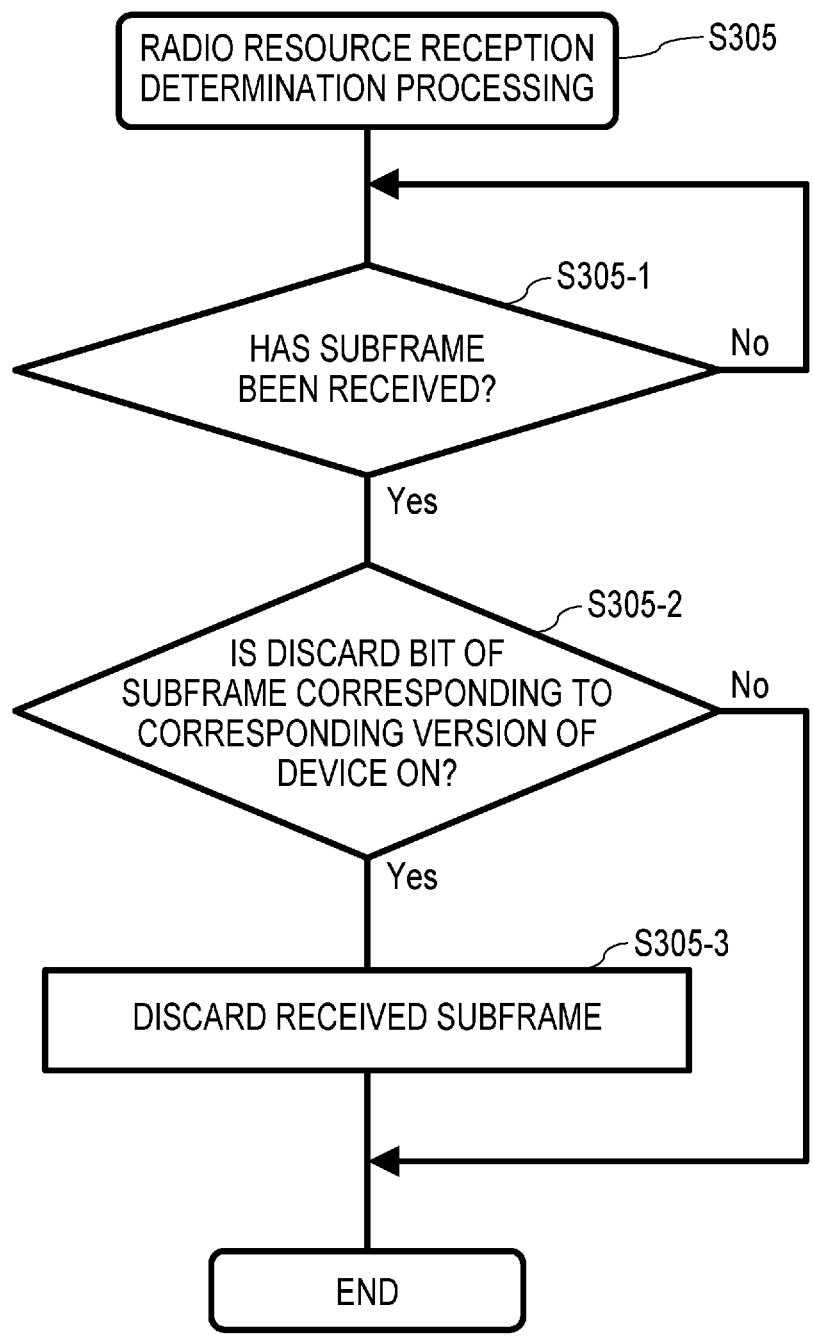
FIG. 14 is a diagram illustrating an example of a processing flowchart of the radio resource reception determination processing S305.

FIG. 14 is a diagram illustrating an example of a processing flowchart of the radio resource reception determination processing S305. The terminal device 100 waits to receive a subframe (No in S305-1). When a subframe is received (Yes in S305-1), the terminal device 100 checks a discard bit included in the subframe which corresponds to the corresponding version of the terminal device (S305-2).

When the discard bit is ON (Yes in S305-2), the terminal device 100 discards the subframe (S305-3). On the other hand, when the discard bit is not ON (No in S305-2), the terminal device 100 receives the subframe and performs a processing in response to reception of the subframe.

Returning to the sequence of FIG. 11, the terminal device 100 receives subframe #01 in the radio resource reception determination processing S305 (S305-3 of FIG. 14).

Then, the base station device 200 transmits subframe #02 (S308). The base station device 200 performs the subframe discard setting processing S303 when transmitting subframe #02. Since the subframe that is a target to be discarded of the terminal device 100 is #02 and the subframe to be transmitted is also #02 in the subframe discard setting processing (Yes in S303-3 of FIG. 13), the base station device 200 sets a discard bit corresponding to the corresponding version of the terminal device 100 to ON (S303-4 of FIG. 13) and transmits subframe #02 (S308).

The terminal device 100 performs the radio resource reception determination processing S305 when subframe #02 is received. The terminal device 100 checks the discard bit corresponding to the corresponding version of the terminal device 100 and discard subframe #02 (S305-3 of FIG. 14) because the discard bit is ON (Yes in S305-2 of FIG. 14).

In the second embodiment, the base station device 200 can cause the terminal device 100 to discard a subframe used for a different purpose from that of the corresponding version of the terminal device 100 by setting a discard bit set for each corresponding version to ON. Accordingly, even when a subframe used to transmit user data in the corresponding version of the terminal device 100 has been changed to be used to transmit a control signal in a new version, for example, it is possible to prevent deterioration of reception quality due to the terminal device 100 misrecognizing a control signal included in the subframe as user data.

On the other hand, a terminal device 100 having the same corresponding version as that of the base station device 200 does not discard a corresponding subframe because a discard bit corresponding to the corresponding version of the terminal device 100 is not set to ON. In this manner, for example, a terminal device 100 of a new version can receive a subframe in accordance with the new version and a terminal device 100 of an old version can discard a subframe whose purpose has been changed in the new version, and thus the quality of the terminal device 100 of the old version does not deteriorate even when the terminal devices 100 of the new and old versions are both present in a communication system.

Furthermore, in the second embodiment, a processing load does not increase in an RRC-related processing such as RRC connection because processing in transmission and reception of an RRC message performed in the first embodiment is not performed.

Other Embodiments

The first and second embodiments may be combined. For example, difference information is included in the RRC message and a discard bit may also be set in a subframe in the first embodiment.

In the first and second embodiments, the base station device 200 notifies the terminal device 100 of difference information or a target to be discarded in units of subframe. However, the base station device 200 may notify, for example, a symbol position in a subframe, a slot number in a subframe, or information indicating either one of the first half and the second half of a subframe instead of the subframe unit. Further, the base station device 200 may notify, for example, a timing at which the terminal device 100 receives a subframe to be discarded, such as a time according to a subframe period. Further, the base station device 200 may notify, for example, a frequency to be discarded by the terminal device or a position of a resource element.

Further, the terminal device 100 may perform predetermined processing instead of discarding. When a subframe that is a target to be discarded has been received, for example, the terminal device 100 may execute a specific program included therein instead of discarding the subframe.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station device in a wireless communication system including a terminal device and the base station device that is wirelessly connected to the terminal device and transmits signals to the terminal device, the base station device comprising:
   an acquirer which acquires a first version of a signal format corresponding to the terminal device; and
   a transmitter that transmits, to the terminal device, difference information relating to a signal used for a different purpose from a purpose of a signal of a second version corresponding to the base station device when the first version differs from the second version,
   wherein the difference information relates to radio resources which are used for user data in the first version of the terminal device and are used for control data in the second version.

2. The base station device according to claim 1, wherein the difference information is information including an instruction for the terminal device to discard the signal used for the different purpose.

3. The base station device according to claim 1, wherein the signal includes a subframe, and
   the difference information includes a number of the subframe used for the different purpose from the purpose of a signal of the second version.

4. The base station device according to claim 3, wherein the transmitter transmits a radio resource control (RRC) message to the terminal device, and
   the transmitting of the difference information is included in the transmitting of the RRC message.

5. The base station device according to claim 1, wherein the difference information includes discard information for instructing the terminal device to discard a received subframe, and
   the transmitter transmits a subframe including the discard information to the terminal device.

6. The base station device according to claim 5, wherein the transmitter sets the discard information for each version of a signal format.

7. The base station device according to claim 1, wherein the signal includes a subframe, and
   the difference information includes a number of a subframe used for the different purpose from the purpose of a signal of the second version, and a symbol position.

8. The base station device according to claim 1, wherein the signal includes a subframe, and
   the difference information includes a number of a subframe used for the different purpose from the purpose of a signal of the second version, and information indicating either one of a first half and a second half of the subframe.

9. A terminal device in a wireless communication system including the terminal device and a base station device that is wirelessly connected to the terminal device and transmits signals to the terminal device, the terminal device comprising:
   a receiver that receives difference information relating to a signal used for a different purpose from a purpose of a signal of a second version of a signal format corresponding to the base station device, the difference information being information transmitted from the base station device and being transmitted by the base station device when a first version of a signal format corresponding to the terminal device differs from the second version; and
   a difference controller which discards the signal used for the different purpose on the basis of the difference information,
   wherein the difference information relates to radio resources which are used for user data in the first version of the terminal device and are used for control data in the second version.

10. A wireless communication system including a terminal device and a base station device that is wirelessly connected to the terminal device and transmits signals to the terminal device,
    wherein the base station device acquires a first version of a signal format corresponding to the terminal device and transmits, to the terminal device, difference information relating to a signal used for a different purpose from a purpose of a signal of a second version corresponding to the base station device when the first version differs from the second version, and
    the terminal device receives the difference information and discards the signal used for the different purpose on the basis of the received difference information,
    the difference information relates to radio resources which are used for user data in the first version of the terminal device and are used for control data in the second version.

* * * * *